(12) United States Patent
Shou et al.

(10) Patent No.: US 7,715,664 B1
(45) Date of Patent: May 11, 2010

(54) HIGH POWER OPTICAL ISOLATOR

(75) Inventors: Yuanxin Shou, Wellesley, MA (US); Qingdon Guo, Nashua, NH (US); Jing Zhao, Winchester, MA (US)

(73) Assignee: Agiltron, Inc., Woburn, MA (US)

( * ) Notice: Subject to any disclaimer, the term of this patent is extended or adjusted under 35 U.S.C. 154(b) by 0 days.

(21) Appl. No.: 12/260,680

(22) Filed: Oct. 29, 2008

Related U.S. Application Data

(60) Provisional application No. 61/000,719, filed on Oct. 29, 2007.

(51) Int. Cl.
*G02B 6/26* (2006.01)
(52) U.S. Cl. .......................................... 385/11
(58) Field of Classification Search ........................ None
See application file for complete search history.

(56) References Cited

U.S. PATENT DOCUMENTS

| 5,546,486 | A | 8/1996 | Shih et al. | |
|---|---|---|---|---|
| 6,587,273 | B2 | 7/2003 | Xue et al. | |
| 6,711,310 | B2 | 3/2004 | Chang et al. | |
| 7,515,780 | B2* | 4/2009 | Chang et al. | 385/11 |
| 2007/0014516 | A1* | 1/2007 | Sato | 385/31 |
| 2007/0110354 | A1* | 5/2007 | Booth et al. | 385/11 |
| 2009/0046347 | A1* | 2/2009 | Wu et al. | 359/280 |
| 2009/0091890 | A1* | 4/2009 | Ochi et al. | 361/704 |

* cited by examiner

*Primary Examiner*—Mike Stahl
(74) *Attorney, Agent, or Firm*—Burns & Levinson LLP; Jacob N. Erlich; Orlando Lopez

(57) ABSTRACT

A high power optical isolator is able to transfer excess heat to a heat sink, reduce the effect of scattered and reflected light, and be coupled to standard thin optical fibers.

18 Claims, 5 Drawing Sheets

HIGH POWER OPTICAL ISOLATOR

CROSS REFERENCE TO RELATED APPLICATIONS

This application claims priority of U.S. Provisional Patent application Ser. No. 61/000,719, entitled HIGH POWER OPTICAL ISOLATOR, filed on Oct. 29, 2007, which is incorporated by reference in its entirety.

BACKGROUND

Optical isolators have been used in the front end of optical systems and other optical components to allow forward light to pass with a low insertion loss and to prevent the light reflected from various external components from interfering with the optimal operation of the various components used in the optical system. This reduces the frequency instability of the laser source, reduces power intensity fluctuations of the optical input signals, and in addition, reduces the overall noise level of the laser and system thereby providing for a higher signal to noise ratio of the system overall. In an optical communication system, a fiber optical isolator allows higher quality optical signals to be transmitted and for passive components to be able to receive these higher quality signals as well.

Recently, high power fiber lasers and fiber amplifiers that are used to amplify optical signals have replaced the solid state laser sources and the gas laser sources that have been widely used in material processing, industrial manufacturing and ultra long distance communication. With these new higher power components, the prior art optical isolators have been unable to efficiently or effectively handle the high optical power.

In particular, when an optical fiber isolator is operated using higher optical power, e.g., >10W, the prior art isolators exhibited several weaknesses that resulted in the isolators being damaged by the high power optical signals. Another issue with prior art optical isolators is backward light propagation.

Therefore what is needed is an optical isolator that provides for the transmission of high optical power signals in a first direction, but prevents other light from disrupting or interfering with the desired optical signal due to the issues with the prior art described above.

SUMMARY

An optical isolator is described for use in a high optical power application. The optical isolator described herein includes a light beam expanded fiber tip, a garnet heat dissipation system, a forward and backward scattering light blocking aperture and a scattering light absorbing box. In the preferred embodiment, the forward propagate light will not be affected; however, the scattering and non-90-degree oriented resident light will be blocked by an aperture from entering the output collimator and a portion of the scattered light will be absorbed by the isolator package box and any backward propagated light will also be blocked by an aperture from entering the input collimator and a portion of the backward propagating light will also be absorbed by the isolator package.

Embodiments of the high power optical isolator and methods for use thereof are disclosed.

BRIEF DESCRIPTION OF THE DRAWINGS

Aspects of the present teachings are pointed out with particularity in the appended claims. The present teachings are illustrated by way of example in the following drawings in which like references indicate similar elements. The following drawings disclose various embodiments of the present teachings for purposes of illustration only and are not intended to limit the scope of the teachings. For purposes of clarity, not every component may be labeled in every figure. In the figures:

DETAILED DESCRIPTION

Figure 1A:
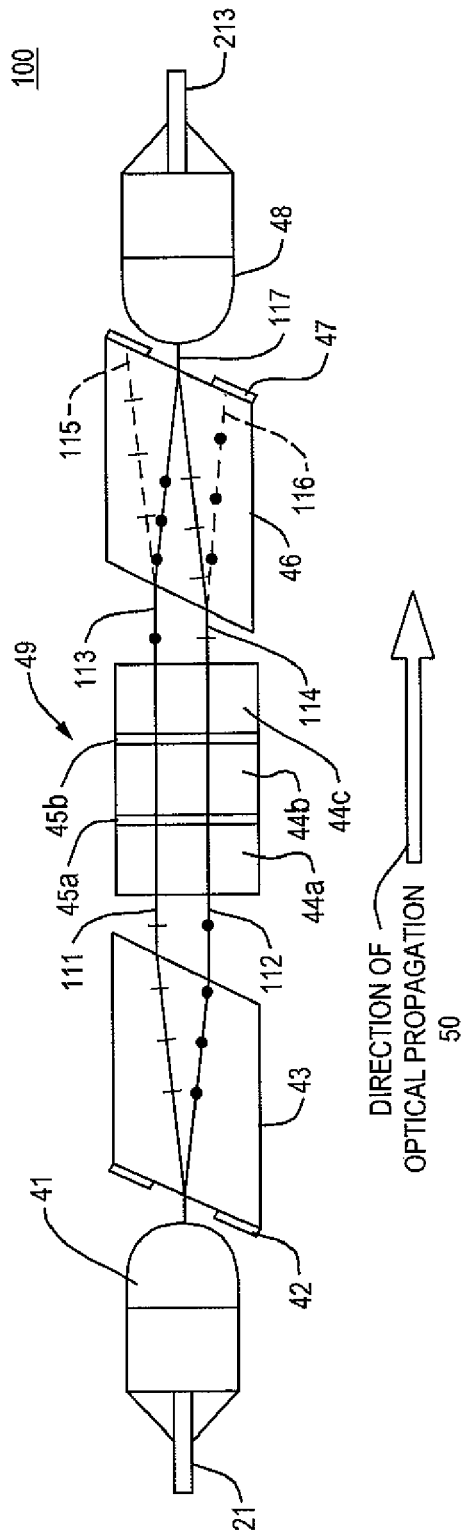
FIGS. 1a and 1b are cross-sectional schematic views of a high power optical isolator of the present teachings.

The following detailed description sets forth numerous specific details to provide a thorough understanding of the teachings. However, those skilled in the art will appreciate that the teachings may be practiced without these specific details. In other instances, well-known methods, procedures, components, protocols, processes, and circuits have not been describe in detail so as not to obscure the teachings.

In order to better understand embodiments of the present invention, some examples of drawbacks of the prior art of optical fiber isolators are analyzed below. For example, one drawback would be where there is an abrupt change in the index of refraction at the end surface of an optical fiber, for example the input and output fiber of the optical isolator. In extreme conditions the input and output fiber may be burnt at its end surface where, because of the abrupt change in the index of refraction, the transmitted optical radiation will produce a high temperature across the small core area of the optical fiber and burn a hole on the output surface of the optical fiber due to the Fresnel diffraction of the high power optical signal. In addition, in the prior art the light rotation materials typically used in optical isolators are garnet based such as BIG, YIG and TGG crystals, all of which have a relative low light power damage threshold. For example, a BIG crystal will be damaged at a power level of approximately 500 mW when the light beam size is approximately 400 μm. The higher power garnet TGG crystal typically has a damage threshold of approximately 20 kW/cm2 for a 1064 nm CW laser. In addition, a garnet crystal also absorbs optical signals and when a high power optical signal is propagated through the garnet crystal, there will be an increase in the temperature of the crystal that degrades the optical performance and changes the optical characteristics of the garnet crystal.

Another problem in the prior art is due to collimator misalignment that aims the optical signal at the wrong portions of the various optical components used within the optical isolator. This can result in multiple reflections within the optical isolator and decrease the signal to noise ratio of the optical signal or provide interference to the optical signal.

Another problem in the prior art is when the optical isolator does not rotate by 90 degrees the forward-propagating-light. This results in the light exiting from the Faraday rotators not being completely coupled into the output fiber via the output collimator. The portion of the forward propagating light that is not coupled into the output fiber will be coupled, via the lens, into the output fiber cladding due to its large incident angle. The residual light that is coupled into the cladding will then leak or radiate from the fiber cladding. Since the transmission light power is very high, even if 1% power is leaked from the cladding, this power will be high enough to burn the epoxy around the fiber inside collimator or the fiber buffer coating. This is the most major problem to cause the high power isolator failure.

As discussed above, backward propagating light is an issue as well. Typically, there are two mechanisms that contribute to the backward propagating light in the optical isolator. The first mechanism is due to a larger divergence angle of backward propagating light by a pair of wedges and the second is producing a walk-off distance of backward propagation of light from the incident light path. Both mechanisms direct the backward propagating light through the isolator and couple the backward propagating light into the input fiber cladding. This has a similar effect to the forward residual light propagation in which the light that has been coupled into the cladding of the input fiber will leak from the input fiber and may burn the epoxy around the input fiber if the power is high enough and possibly damage the input fiber and also increasing the noise of the input optical signal and interfering with it as well.

Embodiments of a high power optical isolator in accordance with the present teachings are described in more detail below. In general, the high power optical isolator is able to increase the power handling capacity of the optical isolator described herein by reducing the power density and/or increasing the effective area of the fiber light passing area, and in addition, by blocking the residual transmission and reflected light from entering the output and input optical fibers. Furthermore, the buffer coating of the output fiber is removed, and the output fiber is slight bent and sealed inside glass tube by sodium silicate, i.e., "water glass", which will allow the light propagating in the cladding to pass into the sodium silicate. This will protect the input or output fiber buffer, which can be acrylate, from overheating and either being damaged or burnt. In addition, by dissipating the heat that has accumulated on each component of the isolator and by absorbing the scattered and reflected light within the isolator itself. The following provides a description of a high power isolator system that includes an input collimator that optically collimates an input optical signal and is further coupled to a birefringent optical beam splitter. The birefringent beam splitter splits the collimated input optical signal into an o-wave and an e-wave and provides the o-wave and e-wave to an isolator core having a plurality of Faraday rotators, wherein each Faraday rotator is coupled to an adjacent Faraday rotator via a half-wave length plate. The isolator core provides for the o-wave and e-wave to be rotated via a pre-determined polarization angle and to provide the now rotated o-wave and e-waves as output to a birefringent beam combiner. The birefringent beam combiner combines the rotated o-wave and rotated e-wave into a single optical signal and provides the single optical signal to an output collimator that couples the output optical signal to an output fiber. In addition, to prevent the coupling of light scattered within the optical isolator, i.e., the residual O-wave and e-wave, which are produced by the birefringent beam combiner, to the cladding of the output fiber via the output collimator, the output surface of the birefringent optical beam combiner includes an output blocking aperture that is configured and dimensioned to prevent the residual o-wave and residual e-wave from being coupled into the output collimator at all, while allowing the combined optical signal to be coupled into the output collimator. Moreover, the output fiber that is disposed on interior of the collimator has an output buffer coating, typically of acrylate, that has been removed and the fiber itself is slightly bent and then sealed in a glass tube by sodium silicate. The allows the light propagating in the cladding of the fiber to leak from the cladding and dissipate within the sodium silicate thereby protecting the next buffer coating of the next segment of fiber from being damaged by excessive heat or burning.

One embodiment of the high power optical isolator is depicted in FIG. 1a, which depicts an optical signal propagating in the direction of arrow 50. In general, the aspects of the high power optical isolator described herein may be applied to any optical isolator; however, the description herein is generally applied to a walk-off type terbium Gallium Garnet (TGG) isolator operating at short wavelength range of approximately 800-1060 nm. The optical isolator 100 includes an input collimator 41 that receives an optical input signal via input fiber 21. The optical isolator 100 also includes a birefringent beam splitter 43, which is optically coupled to the input collimator 41, an isolator core 49, which is optically coupled to the birefringent beam splitter 43 and which includes a plurality of Faraday rotators 44a-c, coupled together by half wavelength plates 45a-b (depicted in greater detail in FIG. 3). A birefringent beam combiner 46 is optically coupled to the output of the isolator core 49 and an output collimator 48 is optically coupled to the output of the birefringent beam combiner 46 that provides the optical signal to an output fiber 213.

In general, light entering the optical isolator 100 via input fiber 21 is collimated by the input collimator 41; the collimated light beam is then split into an o-wave 112 and e-wave 111 by the birefringent beam splitter 43. The two light beams, i.e., the o-wave and the e-wave, 112 and 111, respectively, are coupled to the isolator core 49, which is comprised of three, but not limited to three, Faraday rotators 44a-c each of which is coupled to the adjacent Faraday rotators 44a-c by half wave plates 45a-b. The Faraday rotators 44a-c will rotate both the e-wave and o-wave, 111 and 112, polarization angle by 90 degrees. Thus, the o-wave, 112, will now have a −90 degree polarization, and the e-wave, 111, will now having a 90 degree polarization upon exiting the isolator core 49. The rotated e-wave is now rotated e-wave 113 and the rotated o-wave is now rotated o-wave 114. The birefringent beam combiner 46 will then combine together the rotated o-wave, 114, and the rotated e-wave, 113, into a single optical beam 117 and couple this single beam 117 into the output fiber 213 via output collimator 48.

In general, light entering the optical isolator 100 via input fiber 21 is collimated by the input collimator 41; the collimated light beam is then split into an o-wave 111 and e-wave 112 by the birefringent beam splitter 43. The two light beams, i.e., the o-wave and the e-wave, 111 and 112, respectively, are coupled to the isolator core 49, which is comprised of three, but not limited to three, Faraday rotators 44a-c each of which is coupled to the adjacent Faraday rotators 44a-c by half wave plates 45a-b. The Faraday rotators 44a-c will rotate both the e-wave and o-wave, 111 and 112, polarization angle by 90 degrees. Thus, the o-wave, 112, will now have a −90 degree polarization, and the e-wave, 111, will now having a 90 degree polarization upon exiting the isolator core 49. The rotated e-wave is now rotated e-wave 113 and the rotated O-wave is now rotated a-wave 114. The birefringent beam combiner 46 will then combine together the rotated o-wave, 114, and the rotated e-wave, 113, into a single optical beam 117 and couple this single beam 117 into the output fiber 213 via output collimator 48.

However, since the tolerances of the components used in the high power optical isolator are not exact and each of the components may have its characteristics vary due to changes in temperature, the e-wave 111 and O-wave 112 may not have been rotated through a polarization angle of exactly 90 degrees. If this occurs, when the o-wave 114 and e-wave 113 are combined in the birefringent optical combiner 46, there may be a residual e-wave 115 and a residual o-wave 116 that are formed in the birefringent beam combiner 46 and are split off from the rotated e-wave 113 and the rotated o-wave 114 respectively.

Figure 2:
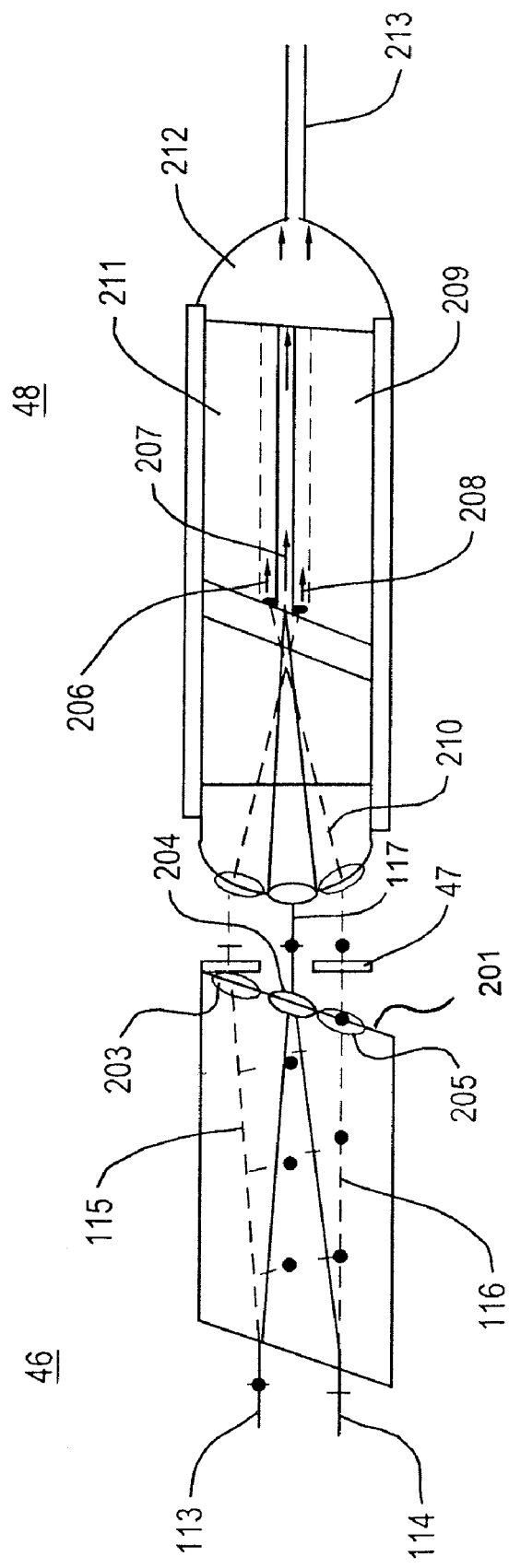
FIG. 2 is a cross sectional schematic view of one embodiment of coupling of light into a collimator of the high power optical isolator, corresponding to the embodiment of FIGS. 1a and 1b.

The e-wave 113 and the O-wave 114 will include the majority of the power of the transmitted optical signal. FIG. 2 depicts the output surface 201 of the birefringent beam combiner 46, and the output collimator in more detail. Although the output surface 201 of the birefringent beam combiner 46 in FIG. 2 is depicted as being square, the output surface 201 can be configured and arranged in any orientation that provides for the necessary optical outputs. As depicted in FIG. 2, the rotated e-wave 113 and the rotated o-wave 114 are combined into optical signal 117 by the birefringent beam combiner 46. However, as discussed above due to the non-ideal nature of the various optical components, a residual e-wave 115 and a residual o-wave 116 may be introduced into the optical isolator 100 via the birefringent beam combiner 46. The residual e-wave 115 and residual o-wave 116 diverge from the e-wave 113 and o-wave 114 that are ultimately combined into combined optical signal 117. As is depicted in FIG. 2, the combined optical signal 117 is coupled to the central core 207 of output fiber 213 and is provided as the output signal thereby. However the residual e-wave 115 and residual a-wave 116 diverge from the e-wave 113 and o-wave 114, respectively, and would not be coupled into the central core 207 of the output fiber 213. Rather, these components will be coupled into the output fiber cladding 206 and propagated via arrow 208 and as discussed above may leak out of the fiber as excess loss resulting in a decrease in the signal to noise ratio of the output optical signal provided by output optical fiber 213.

Figure 1B:
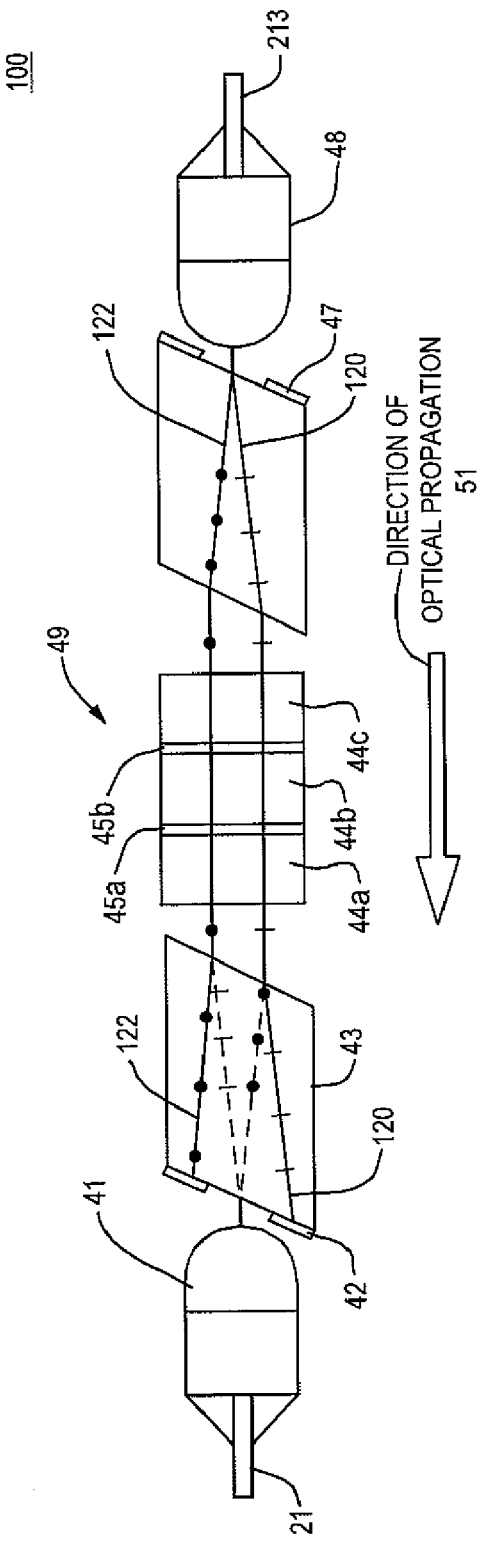
Figure 3:
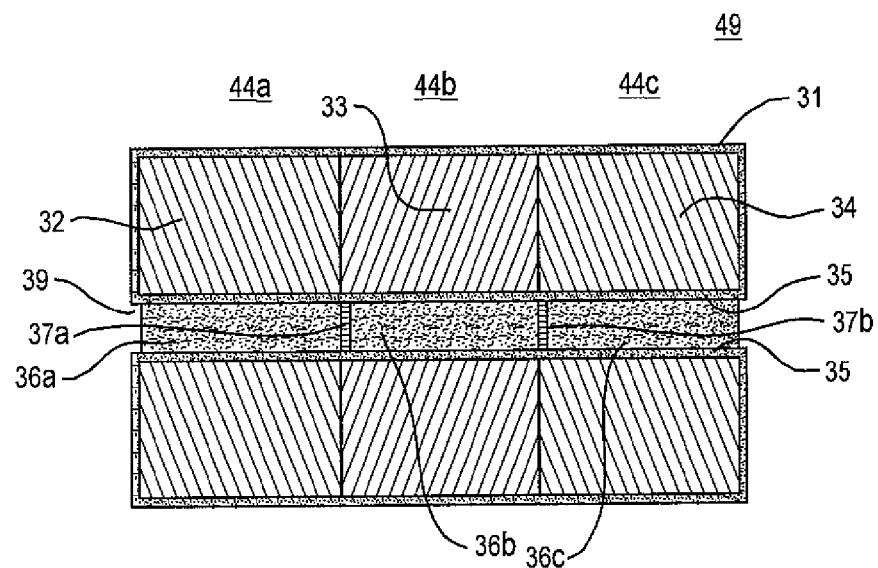
FIG. 3 is a cross sectional view of one embodiment of the isolator core of the high power optical isolator, corresponding to the embodiment of FIGS. 1a and 1b.

As depicted in FIG. 2, the rotated e-wave 113 and rotated O-wave 114 are combined by the birefringent beam combiner 46 into combined optical signal 117 that forms major beam spot 204 at the output surface 201 of birefringent beam combiner 46. As discussed above, the combined optical signal 117 is coupled into output fiber core 207 with low losses. The residual e-wave 115 and o-wave 116 are split by the birefringent beam combiner 46 and each forms output spot 203 and 205, respectively, on the output surface 201 of the birefringent beam combiner 46. As discussed above, these two optical components would be coupled into output fiber cladding 206. However, as depicted in FIGS. 1a, 1b, and 3, the residual e-wave 115 and residual o-wave 116 are blocked by the blocking aperture 47. As discussed in more detail below, the blocking aperture 47 is configured and arranged to pass the optical signal 117, forming spot 204 as discussed above, while blocking the residual e-wave 115 and residual O-wave 116 that form spots 205 and 203, respectively. By blocking the residual e-wave 115 and residual O-wave 116, the high power optical isolator described herein prevents these signals from being coupled into the cladding 206 of output fiber 213 and thereby limits the interference of these signals. As an example, and in no way meant to be limiting, in a high power situation, e.g., an optical signal having a power of 10 W, if 1% of power leaks from fiber cladding due to the propagation of the residual e-wave 115 and residual O-wave 116, then there can be as much as 100 mW of optical power leakage from the output fiber 213. In this example, the fiber buffer coating of output fiber 213 and the adhesive 212, such as an epoxy, which is used to secure the output optical fiber 213 to the output collimator 48, can absorb this power and thereby increasing their temperature to a temperature high enough to actually burn the fiber and epoxy.

Figure 4A:
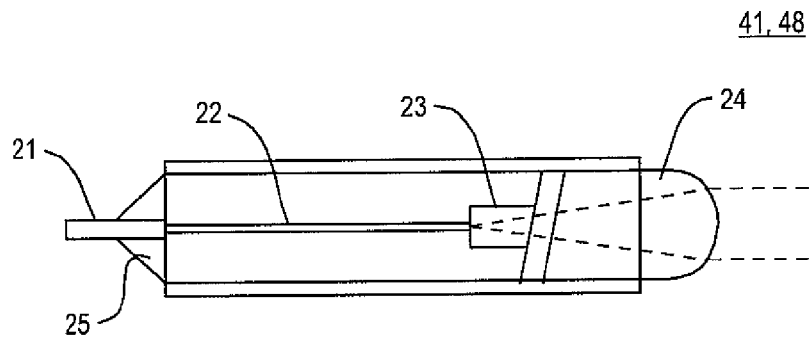
FIGS. 4a and 4b are a cross-sectional schematic view of the input and output collimator of the high power optical isolator, corresponding to the embodiment of FIGS. 1a and 1b.

FIG. 4 depicts the input collimator 41 in greater detail. The input collimator 41 is configured to provide an additional power handling capacity to the high power optical isolator 100 described herein. In particular, to avoid the problems in the prior art of an abrupt change in the index of refraction at the end surface of the fiber pigtail 22 that is used to coupled the incoming optical signal received from input optical fiber 21 into the input collimator 41. The problem is that this abrupt change may produce transmitted and reflected optical signals that can produce a high temperature at the small core area of the fiber 22 and may actually burn the fiber core. Therefore, in the present embodiment depicted in FIG. 4, the fiber 22 is spliced to a segment of pure silica coreless fiber 23 that has a diameter substantially greater than that of the fiber 22, for example a diameter of approximately 400 µm. This splicing may be accomplished by an ordinary fusion splice machine as is known in the art. The spliced fiber tip of fiber 22 has very low splice loss (<0.1 dB) and the effective diameter of the light passing area can be increased from 10 µm to approximately 230 µm. Thus, the power density, which is approximated proportion to $1/r^2$, will decrease approximately 530 times. The light signal is then provided to collimator lens 24 that is configured and arranged to collimate the incoming light signal as is known in the art. In addition, the output lens 24 is a C-lens has large radius curvature and low refractive index so that its long back focus length can match the larger core size fiber segment length and its larger beam size can reduce the power density on all elements of isolator. Special high quality anti-reflection coatings are disposed on all optical surfaces protect them from absorbing high power optical energy and being damaged by high temperatures.

The selection of the dimension of the aperture opening of both the blocking apertures is a function of the system design and in particular the size of the laser beam used. In order to avoid excessive insertion loss, the aperture diameter should not be made too small or the aperture will block a portion of the light that is to pass through the aperture opening. If the diameter of the aperture opening is made too large, the residual light that is to be blocked may be allowed to leak through the opening and cause interference or a decrease in signal to noise ratio of the system. In general, the diameter of the aperture opening should be slightly greater than the diameter of the signal beam. Because no system is perfect, some surplus residual light will be coupled into the output (or input) fiber cladding. When the power of the optical signal is low, e.g., less than 20 W, the embodiment of FIG. 4A can be used for either the input or output collimator. However, when the transmission power is high, e.g., greater than 30 W, the leaked residual light coupling into the output (or input) fiber cladding will be high enough to cause the epoxy or fiber buffer coating to be damaged by the excessive heat or even to burn.

Figure 4B:
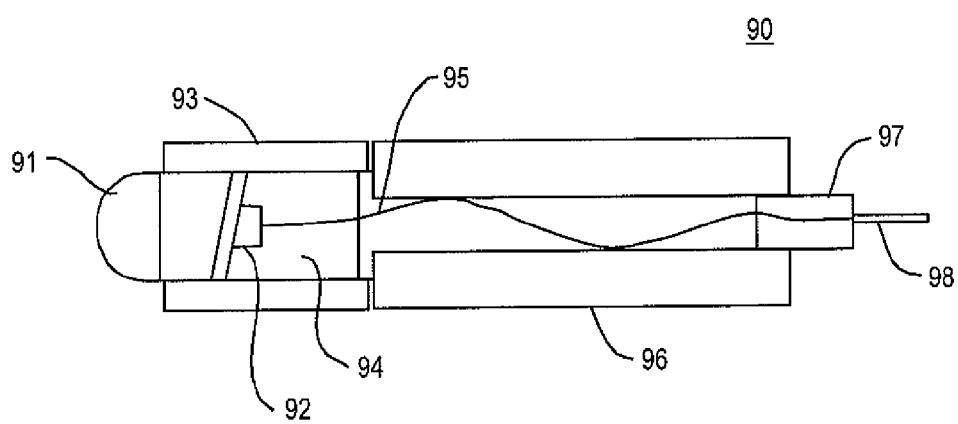

In the event that the higher power optical signal is used, i.e., optical power greater than 30 W, FIG. 4B, depicts another embodiment of the output or input collimator. The fiber tip 92 and the fiber 95 both have their outer buffer removed. The fiber 95 is bonded inside of a glass ferrule 94 by a water based low temperature glass, such as sodium silicate, which is highly transparent to light and will not burn when high power light is transmitted through it. The C-lens 91 is bonded inside of a glass tube 93 to form the fiber collimator lens and is coupled to the fiber tip 92. The fiber 95 passes through the interior of a glass tube 96 and is bonded inside of a glass ferrule 97. An output fiber 98 is inserted into the other end of the glass ferrule 97 in order to allow light to pass therethrough. The glass ferrule 97 is disposed within a glass tube 96 and is configured and arranged such that the fiber 95 is slightly bent within the glass tube 96. The glass ferrule 97 is bonded with glass tube 96 with sodium silicate or a similar compound. In this embodiment, the bend induced in fiber 95 functions to allow the light propagating in the cladding of fiber 95 to leak into the sodium silicate such that substantially all of the light propagating within the cladding light will radiate due to the bend loss. Because the power of the light propagating in cladding power radiates gradually along the length of fiber 95, the power density of the radiated light will not be sufficiently high to damage or burn the components the power density will be dramatically reduced prior to the light reaching the outside fiber 98. Due to the bend loss, all of the light propagating in the cladding will be removed, and will therefore not add any additional insertion loss to the desired optical signals propagating within the core of fiber 95. It is recommended, but not limited to, that for a long term reliable fiber, a fiber will have a "no loss" bend radius for single mode fiber of approximately 35 mm. Since the fiber 95 is secured and sealed inside of glass tube 96 with the sodium silicate bond, it will also not be affected by moisture and its reliability will be higher than a fused fiber coupler.

Figure 7:
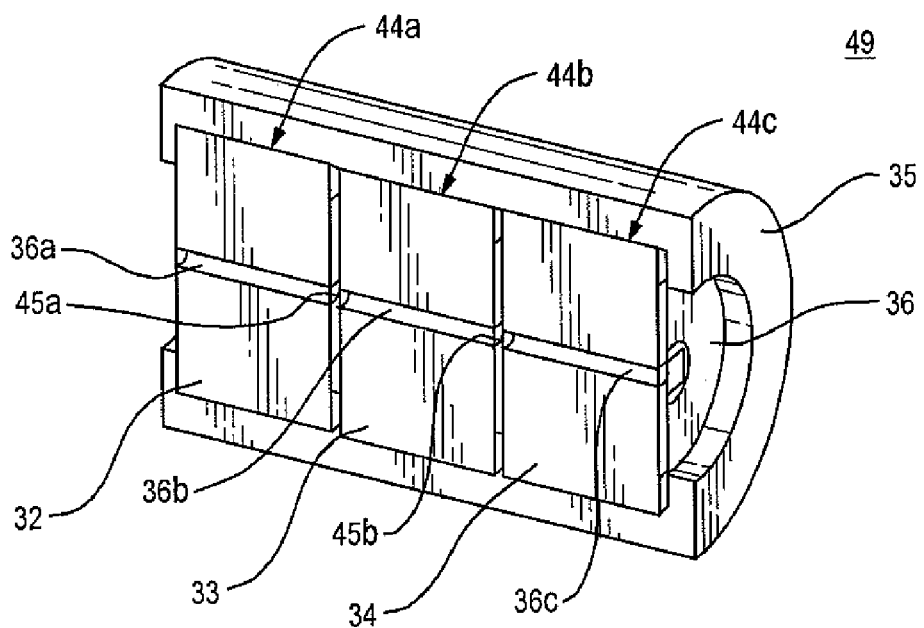
FIG. 7 is a cross-sectional schematic view of the isolator core, corresponding to the embodiment of FIGS. 1a and 1b.
Figure 8:
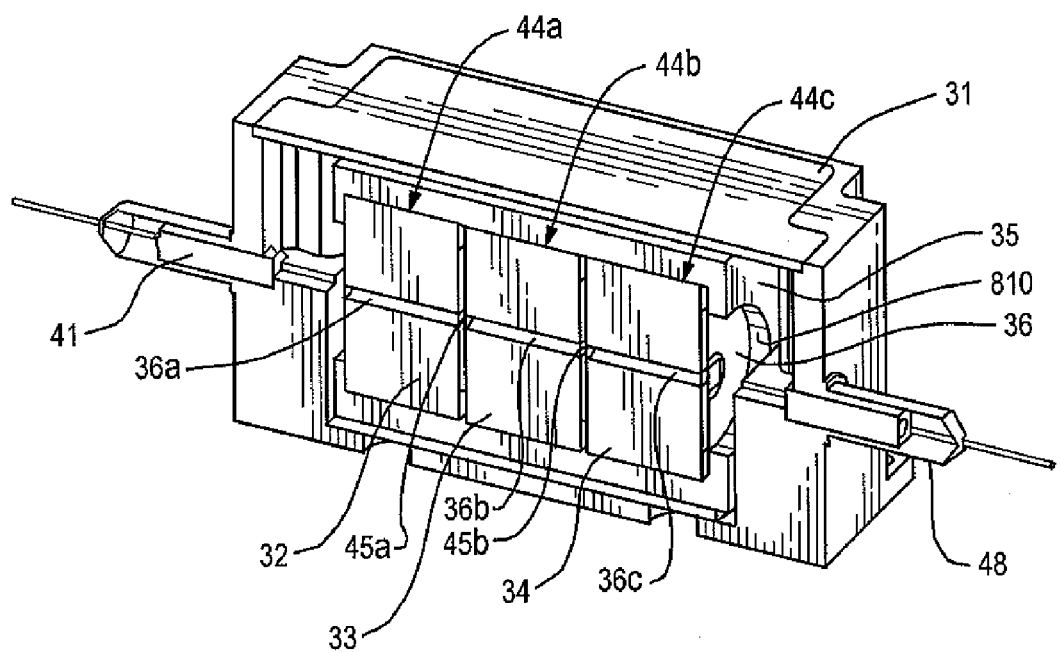
FIG. 8 is a cross-sectional schematic view of the isolator, including the surrounding package, corresponding to the embodiment of FIGS. 1a and 1b.

FIG. 3 depicts, in greater detail, an embodiment of the isolator core 49 used in the high power optical isolator described herein. An embodiment of the isolator core 49 is depicted in FIGS. 3, 7 and 8. In particular, the isolator core 49 includes three magnetic rods 32, 33 and 34 each of which is configured to have a central core 39 coaxially disposed there through. In the isolator core 49 the three magnetic rods are arranged such that the central core 39 of each are aligned with one another to form a core extending through all of the magnetic rods 32, 33, and 34 and in addition, each of the magnetic rods are disposed in an alternate polarity configuration. Disposed coaxially within the central core 39 of the three magnetic rods 32, 33, and 34 and surrounded by the three magnetic rods 32, 33, and 34, are three rotator rods 36a, 36b, and 36c, respectively. The combination of magnetic rod 32 and rotator rod 36a forms a first Faraday rotator 44a. The combination of magnetic rod 33 and rotator rod 36b forms a second Faraday rotator 44b. The combination of magnetic rod 34 and rotator rod 36c forms a third Faraday rotator 44c. The rotator rod 36a is coupled to rotator rod 36b via one half wavelength plate 45a and rotator rod 36b is coupled to rotator rod 36c via one half wavelength plate 45b. With this configuration, an incoming optical signal will have its polarization angle rotated by 90 degrees due to the combined effect of the three Faraday rotators 44a-c and the half wavelength plates 45a and 45b. This is because each of the three Faraday rotators, 44a-c, provide a 45 degree polarization rotation, i.e., 135 degrees, and the two half wavelength plates 45a and 45b each provide a rotation of −22.5 degrees angle, for a total of −45 degrees, for a total rotation of 90 degrees.

In the high power optical isolator described herein, the rotator rods 36a, 36b, and 36c, will be for example and in no way meant to be limiting, a TGG rod. As with any optical component, each rotator rod 36a-c will absorb some portion of the light incident upon it and transmitted through it and will, therefore, be heated by the absorption of this optical radiation. This light absorption will increase the temperature of the rotator rods 36a-c, which will change the Verdet constant, i.e., the optical constant that describes the strength of the Faraday Effect for optical materials, of the rotator rods 36a-c. In general, the increase in temperature will reduce the Verdet constant and thereby reduce the change of the polarization angle of the optical signal being transmitted through the particular rotator rod 36a-c. In addition, if the temperature of one or more of the rotator rods 36a-c increases to a sufficiently high temperature, the rotator rod 36a-c may also be damaged by the high temperature.

In the instance where the rotator rods 36a, 36b, and 36c are formed using TGG crystal, it is known that TGG crystal has a thermal conductivity of approximately 7.4 W/(cm.K). This thermal conductivity is similar to the thermal conductivity of an average metal. However, the magnetic rods 32-34 typically only have a thermal conductivity of about 0.1 W/(cm.K) and therefore can neither transfer nor dissipate heat efficiently. Therefore in the high power optical isolator described herein, the three rotator rods 36a, 36b, and 36c and the half wavelength plates 45a and 45b are mounted on the inside of a cylindrical metal substrate 35. As depicted in FIG. 8 the metal substrate 35, which encompasses the magnetic rods 32-34 and the rotator rods 36a, 36b, and 36c, is then thermally coupled to an outside metal casing 31. The metal casing 31 is then attached and thermally coupled to the package metal box and/or to an external heat sink (not shown).

In addition to the forward propagation of light described above, there is also a reflected light component propagating in the opposite direction shown by arrow 51. FIG. 1b depicts the backward propagation of a light signal in the high power optical isolator described herein, wherein the light propagation direction is in the direction 51. As light propagates through the high power optical isolator described herein, a portion of the optical signal 117 that is incident upon the output collimator 48 will be reflected and propagate backwards through the high power optical isolator. This reflected portion will be split by the birefringent optical combiner 46 into a reflected o-wave 120 and a reflected e-wave 122, and will propagate in the direction 51. The reflected O-wave 120 and reflected e-wave 122 back propagate through the isolator core 49 without a polarization angle change, and therefore reflected O-wave and reflected e-wave, 120 and 122, respectively, are further split from one another by birefringent optical splitter 43. In the high power optical isolator described herein, the back propagating reflected o-wave 120 and reflected e-wave 122 are blocked by blocking portions of aperture 42 from entering the input collimator 41 while the input optical signal provided by input fiber 21 is passed via the aperture in the blocking aperture and coupled into the birefringent beam splitter. By preventing the reflected o-wave and e-wave from entering the input collimator, the effect of the reflected signal in decreasing the signal to noise ratio of the high power optical isolator and interfering with the input optical signal, as described above, is reduced. In one embodiment, the beam splitter crystal 43 has a 45 degree angle between optical axis and light forward propagation direction and around 6 degree tilted surfaces.

One advantage of the birefringent beam splitter 43 is the reflected e-wave and reflected O-wave, 122 and 120 have the same splitting angle relative to the transmitted e-wave and O-wave, 111 and 112, respectively. Therefore the forward propagating signals, 111 and 112 and the backward propagating signals 122 and 120 beam are collocated at the central of cross section of birefringent optical splitter 43 and isolator core 49. This allows for easier device alignment and reduces the overall package size. Another advantage of this configuration is that the tilt surface of 6 degrees of the birefringent beam splitter 43 can also reduce the back reflection and decrease device return loss.

In general, fiber used in high power laser is a double cladding large mode area fiber that has a core diameter of approximately 20~30 μm, a NA of 0.05~0.1, and an inner cladding of 250 μm with a NA of 0.46~0.6. In this configuration, any reflected light that is captured by the inner cladding will be coupled back into the fiber core, which in turn reduces the device return loss. The tilted surface of the birefringent beam splitter 49 has less reflection than a vertical surface would.

Figure 5:
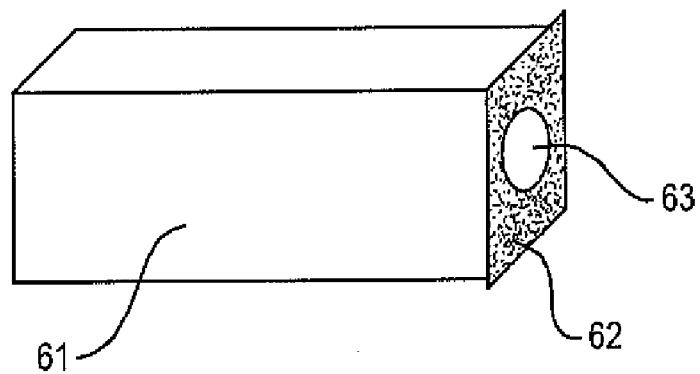
FIG. 5 is a view of the blocking aperture of the high power optical isolator, corresponding to the embodiment of FIGS. 1a and 1b.

As depicted in FIG. 5, the blocking apertures may comprise a metal sheet 62 that has been bonded to the surface of the crystal. In particular, the metal sheet 62 is attached to an end surface of the crystal 61 and an aperture 63 is formed in the metal 62. The aperture typically has a diameter that is slightly greater than the optical signal beam diameter that will be incident upon the end surface of crystal 61.

Figure 6:
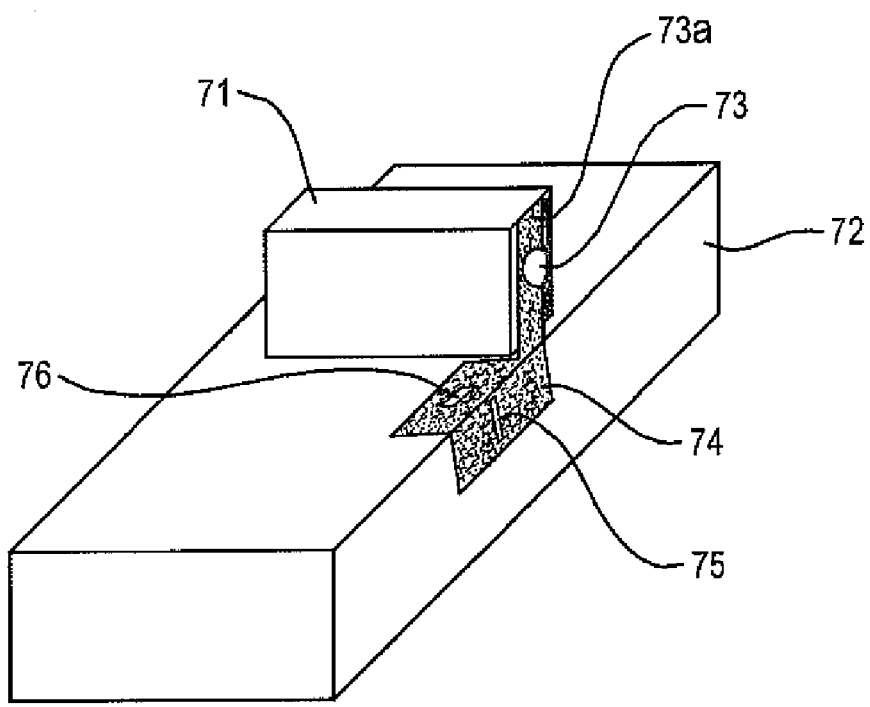
FIG. 6 is a cross-sectional schematic view of yet another embodiment of the blocking aperture, corresponding to the embodiment of FIGS. 1a and 1b.

Alternatively, a depicted in FIG. 6 the crystal 71 is mounted on a crystal holder 72 and a metal aperture holder 74 is attached on the crystal holder. The aperture holder 74 is mechanically coupled to the blocking aperture 73a that includes a light passing aperture 73. The aperture holder 74 includes a vertical adjusting screw slit 75 and horizontal screw adjusting slit 76 that are configured and arranged to allow the proper alignment of the aperture 73.

As discussed above, the isolator core 49 is enclosed within a metal cylinder and contained within a package box 800, as depicted in FIG. 8. Due to the presence of the second surface aperture and the first surface aperture, backward propagating light and forward residual light will reflect within the interior of isolator package 800. In the present invention, the interior surface of the isolator package 800 should be made of high thermal conductive metal, a high absorption coating material on the interior surface of the isolator package 800, and a pattern of deep and narrow v-grooves 810 are provided in the interior surface to increase the surface area of the interior surface as well as providing optical paths that do not permit reflection of the unwanted optical radiation out of the isolator package 800.

It should be appreciated that other variations to and modifications of the above-described high power optical isolator may be made without departing from the inventive concepts described herein. Accordingly, the teachings should not be viewed as limited except by the scope and spirit of the appended claims.

What is claimed is:

1. A high power optical isolator for transmitting an input optical signal comprising:
    an input collimator capable of receiving the input optical signal and to provide an output of a collimated optical signal;
    a birefringent optical beam splitter having a first surface optically coupled to said collimated optical signal from said input collimator, wherein said birefringent optical beam splitter is operative to split said collimated optical signal into an o-wave and an e-wave and to provide said o-wave and said e-wave as an output via a second surface, said birefringent optical beam splitter further including a first blocking aperture disposed on said first surface of said birefringent optical beam splitter, said first blocking aperture including a blocking portion and an aperture portion, said blocking portion of said first blocking aperture operative to prevent reflected optical signals from entering said input collimator and said aperture portion configured and arranged to allow said collimated optical signal to pass through to said birefringent optical splitter;
    an isolator core having an input optically coupled to said second surface of said birefringent optical beam splitter and operative to receive said o-wave and said e-wave there from, said isolator core including a plurality of Faraday rotators each coupled to an adjacent Faraday rotator via a half wavelength plate, wherein said half wavelength is the half wavelength of the input optical signal, said isolator core operative to rotate said o-wave and e-wave through a preselected polarization angle and to provide said rotated o-wave and e-wave as an output;
    a birefringent optical beam combiner having a first surface optically coupled to said isolator core output and operative to receive said rotated o-wave and said rotated e-wave there from, wherein said birefringent optical beam combiner is operative to combine said rotated o-wave and said rotated e-wave into a combined optical signal and is further operative to provide said combined optical signal as an output optical signal, said birefringent optical beam combiner further including a second surface including a second blocking aperture, said second blocking aperture including a blocking portion operative to prevent a residual o-wave signal and a residual e-wave signal from entering an output collimator and said second blocking aperture further including an aperture portion configured and arranged to allow said combined optical signal to pass through as an output optical signal; and
    an output collimator optically coupled to said birefringent optical beam combiner via said second blocking aperture and operative to receive said output optical signal and focus said output optical signal into a center core region of an optical output fiber.

2. The high power optical isolator of claim 1, wherein said input collimator comprises:
    an input fiber core optically coupled to a collimator fiber core having a larger diameter than said input fiber core;
    a collimator lens matched to said collimator fiber core and optically coupled thereto, wherein said collimator lens provides for a collimated optical output signal.

3. The high power optical signal of claim 2 wherein said collimator lens is a C-lens having a large radius of curvature and a low refractive index, wherein said collimator lens includes a back focal length sufficient to match to a collimator fiber.

4. The high power optical isolator of claim 1, wherein said isolator core further comprises:
    a metal substrate;
    said Faraday rotators being thermally coupled to said metal substrate; and
    said metal substrate being thermally coupled to an external container.

5. The high power optical isolator of claim 4, wherein said Faraday rotators are thermally coupled to said metal substrate using high thermal conductivity epoxy.

6. The high power optical isolator of claim 4, wherein said Faraday rotators are thermally coupled to said metal substrate by being physically disposed against said metal substrate.

7. The high power optical isolator of claim 1, wherein said first blocking aperture is configured and dimensioned to block a plurality of residual optical signals being back propagated through said birefringent optical beam splitter.

8. The high power optical isolator of claim 1, wherein said second blocking aperture is configured and dimensioned to block a plurality of residual optical signals being propagated through said birefringent optical beam combiner.

9. The high power optical isolator of claim 1, wherein said birefringent optical splitter comprises birefringent material having an optical axis at 45 degree with respect to the input optical signal propagation direction and a surface having substantially a 5.8 degree tilted surface angle.

10. The high power optical isolator of claim 1, wherein said birefringent optical beam combiner comprises birefringent material having an optical axis at 45 degree with respect to the input optical signal propagation direction and a surface having a 5.8 degree tilted surface angle.

11. The high power optical isolator of claim 1, wherein said isolator core further comprises:
    an enclosure having a thermal conductivity material to allow high thermal transfer rates between said Faraday rotators and an external heat sink, said enclosure comprising an internal surface, said internal surface having a coating of high optically absorbent material disposed thereon.

12. The high power optical isolator of claim 11, wherein said internal surface of said enclosure includes V-shaped grooves disposed thereon.

13. The high power optical isolator of claim 1, wherein said output collimator comprises:
    a first tube having an interior;
    a first ferrule disposed within said interior of said first tube,
    a fiber disposed within said interior of said first tube and having a first end optically coupled to said first ferrule, said fiber being configured and arranged to include at least one bend;
    a bonding agent for bonding said fiber and said first ferrule to said first glass tube
    a second tube having an interior, said second tube being coupled to said first tube, wherein said interior of said second tube is in communication with said interior of said first tube;
    said fiber further disposed within said interior of said second tube;
    a fiber tip disposed within said interior of said second tube and having a first face coupled to a second end of said fiber; and
    a lens optically coupled to said fiber tip.

14. The high power optical isolator of claim 13, wherein said first and second tubes are comprised of glass.

15. The high power optical isolator of claim 13, wherein said lens is a C-lens.

16. The high power optical isolator of claim 1, wherein said input collimator comprises:
    a first tube having an interior;
    a first ferrule disposed within said interior of said first tube,
    a fiber disposed within said interior of said first tube and having a first end optically coupled to said first ferrule, said fiber being configured and arranged to include at least one bend;
    a bonding agent for bonding said fiber and said first ferrule to said first glass tube;
    a second tube having an interior, said second tube being coupled to said first tube, wherein said interior of said second tube is in communication with said interior of said first tube;
    said fiber further disposed within said interior of said second tube;
    a fiber tip disposed within said interior of said second tube and having a first face coupled to a second end of said fiber; and
    a lens optically coupled to said fiber tip.

17. The high power optical isolator of claim 13, wherein said first and second tubes are comprised of glass.

18. The high power optical isolator of claim 13, wherein said lens is a C-lens.

* * * * *